UNITED STATES PATENT OFFICE.

JOHN AMBROSE FLEMING, OF PIMLICO, LONDON, COUNTY OF MIDDLESEX, ENGLAND.

PREPARATION AND PRODUCTION OF INSULATING MATERIALS.

SPECIFICATION forming part of Letters Patent No. 319,084, dated June 2, 1885.

Application filed April 8, 1885. (No specimens.) Patented in England April 22, 1884, No. 6,647.

*To all whom it may concern:*

Be it known that I, JOHN AMBROSE FLEMING, a subject of the Queen of Great Britain and Ireland, and residing at Pimlico, London, in the county of Middlesex, England, have invented certain new and useful Improvements in the Preparation and Production of Insulating Materials or Articles, (for which I have applied for Letters Patent in Great Britain, No. 6,647, dated April 22, 1884;) and I do hereby declare that the following is a full, clear, and exact description of the invention, which will enable others skilled in the art to which it appertains to make and use the same.

My invention relating to the preparation or production of insulating materials or articles, has reference to improvements upon a former invention in respect of which I obtained Letters Patent, dated September 4, 1883, No. 284,289; and my present invention has for its object obtaining greater coherence of the ingredients of which the material or article is composed, and also preventing the expansion of the material or article during the operation of molding.

In carrying out my invention in order to effect this object, I take wood in a finely-divided condition, or other vegetable fibrous material—such, for example, as wood-flour, bran, straw, cotton, jute, hemp, papier-maché, in a finely-divided condition—and, having thoroughly desiccated the same in a vacuum, or by superheated steam or otherwise, I saturate or impregnate it—under pressure or not—with a mixture consisting of melted bitumen or asphalt incorporated with silicate of magnesia, or silicate of lime, or silicate of iron, or silicate of alumina, or two or more of such silicates used in conjunction, and with amber resin or other resin having a high melting-point—such, for example, as kauri resin—and I then mold the mass under pressure into the required shape.

The silicates before mentioned may be derived from any available source, whether natural or artificial. Good results have been obtained by the use in conjunction (in the proportion of, say, about equal parts, by weight) of steatite and a fibrous variety of hornblende; but silicate cotton prepared from blast-furnace slag has been advantageously employed as an equivalent in the mixture for either the steatite or the hornblende.

In preparing the mixture the bitumen or asphalt and resin, after having been purified by a process of melting, are separately reduced to a very fine state of division, and are then mixed together in the proportion of, say, about equal parts, by weight. These ingredients, thus ground up and mixed together, are next melted in a pan by any suitable means, and a weight of dried silicates—say about equal to that of the bitumen or asphalt and resin together—is added to them, the mixture being maintained at a temperature of, say, about 250° centigrade for a sufficient length of time for the several ingredients to become thoroughly incorporated together. A thin pasty mass is thus produced, into which the desiccated finely-divided vegetable fibrous material is introduced, and with which it is intimately mixed by stirring, while the mass is still maintained at the said temperature. The mixing having then been completed, the material is ready to be placed in molds of the shape of the article to be produced, the article being formed by pressure applied in any suitable manner.

The desiccated finely-divided vegetable fibrous material may be employed in the proportion of, say, about ten per cent. of the weight of the other ingredients taken together; but this proportion, as also the relative proportions in which the bitumen or asphalt and resin and the silicates are used, may be varied. It should, however, be observed that the quantity of the silicates should not be increased to such an extent as to make the pasty consistence too thick, which would impede the ready incorporation with it of the desiccated finely-divided vegetable fibrous material by stirring or mixing, while a too fluid condition of the mass must be equally guarded against. The exact proportions to give the best results, according to the varied character of the ingredients employed, may be readily ascertained by testing in small quantities from the directions hereinbefore given.

Having fully described my invention, what I desire to claim and secure by Letters Patent is—

The preparation or production of insulating materials or articles by the employment of wood or other vegetable fibrous material, as herein set forth, in a finely-divided condition, desiccated and saturated or impregnated with a mixture consisting of melted bitumen or asphalt incorporated with silicate of magnesia, or silicate of lime, or silicate of iron, or silicate of alumina, or two or more of such silicates used in conjunction, and with amber resin or equivalent resin, the whole being molded under pressure, substantially as hereinbefore described.

In testimony whereof I have signed my name to this specification in the presence of two subscribing witnesses.

JOHN AMBROSE FLEMING.

Witnesses:
   THOMAS JOHN HANDFORD,
   ALFRED JOHN MAXWELL,
Both of 42 Southampton Buildings, London.